Sept. 13, 1960       W. TIRASPOLSKY ET AL       2,952,494
            REVOLUBLE ENGINES AND MOTORS FOR SUBTERRANEAN DRILLING
Filed Oct. 14, 1957                                    2 Sheets-Sheet 1

INVENTOR.
Wladimir Tiraspolsky
Roger Francois Rouvière
BY Beaman & Beaman
ATTORNEY

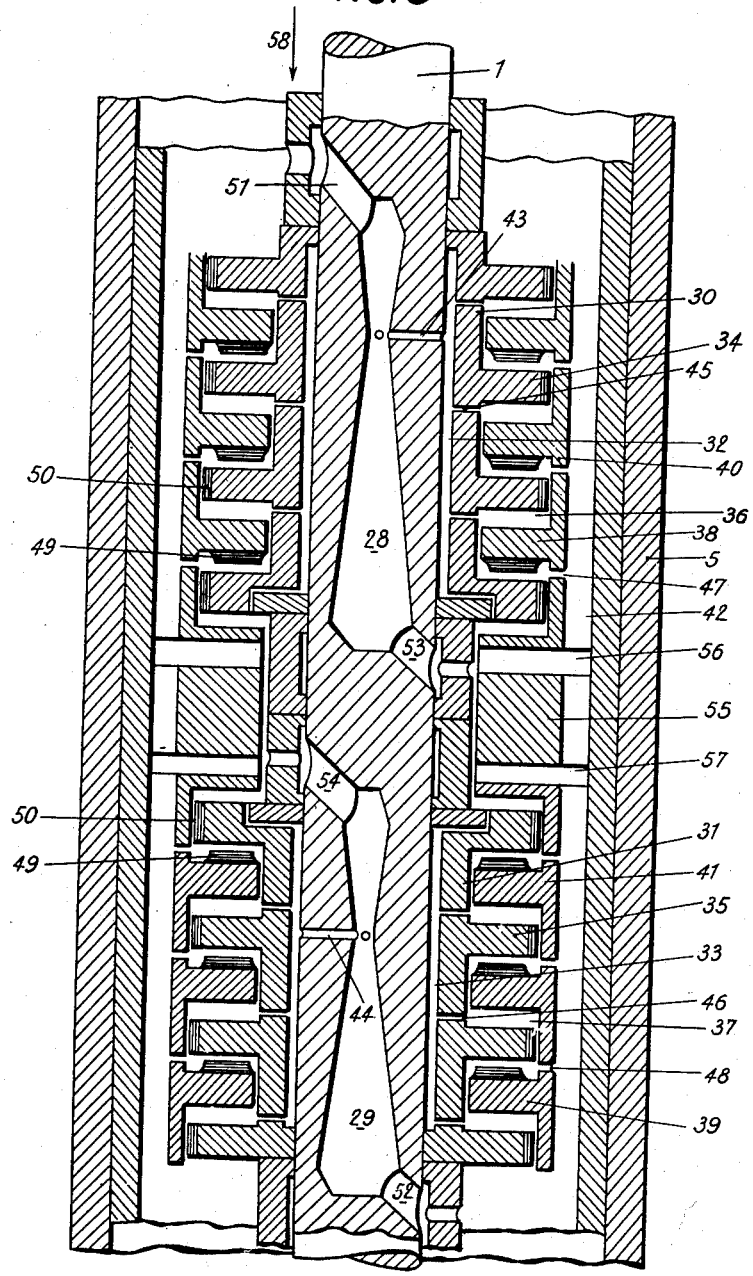

United States Patent Office 2,952,494
Patented Sept. 13, 1960

2,952,494
REVOLUBLE ENGINES AND MOTORS FOR SUBTERRANEAN DRILLING

Wladimir Tiraspolsky, 69 Avenue Victor Cresson, Issy-les-Moulineaux, and Roger François Rouviere, Castor, Lot No. 24, Aureilhan, France Filed Oct. 14, 1957, Ser. No. 690,031

Claims priority, application France Oct. 12, 1956

7 Claims. (Cl. 308—9)

Revoluble engines and motors for sub-surface or underground work and notably drilling turbines generally comprise one or several thrust bearings the main purpose of which is to limit the axial play or clearance between the rotor part and the stator part of the motor or turbine irrespective of the axial force transmitted by one of said parts to the other. Such force may be due on the one hand to the weight of the revoluble part and to the hydraulic thrust exerted by the circulating fluid on this revoluble part and on the other hand to the thrust which must be transmitted to the drilling tool while it is operating, these several forces being algebraically added.

Thrust bearings as at present in use are generally multiple bearings of the roller type or alternatively of the type involving a sliding action between metal surfaces and surfaces coated with a material such as rubber. Such thrust bearings undergo a rapid wear owing to the heavy duties and loads to which they are subjected during operation and also on account of the high vibrations that are transmitted by the drilling tool to the rotary part, of the abrading action of those particles which may be contained in the circulating fluid which surrounds the slipping bearings and from which roller bearings cannot be isolated except with the utmost difficulties.

The only available methods whereby to a certain extent the wear and tear of thrust bearings may be restricted involve on the one hand a purification of the circulating fluid and on the other hand an adjustment of the load as applied to the thrust bearings for keeping the same down to a value close to zero. Now the purification of the fluid is an expensive step which is almost impossible to achieve to perfection while the adjustment of the load reduces the available thrust to the weight of the rotary parts or to the component of such weight (for inclined drillings) and to the hydraulic thrust exerted by the circulating fluid on the rotary part. The possibility is indeed afforded by this method appreciably to lengthen the durability of thrust bearings but a constant watch is necessary while no possibility is available to take advantage to the utmost of the mechanical performances of the drilling appliance. Moreover in some cases such method cannot be used, for example when the load upon the tool which may call for stalling of the turbine shaft is smaller than the aforesaid axial thrust or where special reasons such for example as the desire of finding a predetermined deviation gradient in a directed drilling restrict the weight that can be supported by the drilling bit.

An object of the invention is to remedy the aforesaid disadvantage and to provide a motor or engine for subsurface or underground work and particularly a drilling turbine equipped with an improved balanced thrust bearing.

Viewed in a general aspect the invention is embodied in a motor or turbine for underground work comprising at least one chamber defining a cylinder in which a double acting piston is movable, said piston having its faces acted upon by the differential pressures of an operating fluid, said chamber and piston being respectively connected to the stationary and rotary parts of the motor or turbine or conversely, means being provided for varying at least one of said pressures in terms of thrusts exerted upon the motor and particularly on its shaft and on one of its revoluble parts with a view to compensating such thrusts and to bringing said parts to a balanced condition.

According to one feature of the invention, at least one of said pressures is automatically adjusted by the axial motion of the rotor part with respect to the stator part of the motor so as to compensate for the variation of the axial thrust which caused said motion.

The fluid which is operative upon the piston or pistons may be advantageously the circulating fluid particularly in the case of a drilling turbine. The piston or pistons may be operatively connected to movable parts and/or to stationary parts of the motor.

According to another feature of the invention, the pressure differential operative upon the piston or pistons for balancing the thrust is supplied by the suction effect created by a local increase of the speed of the fluid current through one or several nozzles. The latter may be advantageously of the convergent-divergent type and may comprise for example a venturi tube which presents the advantage of providing high pressure differences for a small charge loss.

The arrangement may be such that the entirety of the fluid current flows through the nozzle or nozzles. Alternatively only a portion of said current may flow therethrough. Said nozzles may be fitted in the stator part or in the rotor part of the motor or they may be constituted by suitable cooperating portions of said stator and rotor parts. A nozzle or a group of nozzles may be connected to one face of the piston, while another group is connected to its other face. Each nozzle or group of nozzles may be so arranged as to be simultaneously operative upon a set of pistons. The nozzles may be arranged either in parallel or in series. One nozzle may be operative upon a suction zone formed in another nozzle, thereby considerably increasing the resultant pressure difference.

According to a constructional form, the differential pressure may be derived from the short-circuiting of two motor zones in which different pressures prevail, for example two different points of the flow circuit of a multiple stage turbine or a point situated inside the turbine, and another point situated outside the turbine. In this case, a portion of the fluid may be derived without flowing through the underground motor or the entire underground motor.

According to a constructional modification, the differential pressure may be supplied by a separate power source such as a pump which may be driven by the drilling motor itself or by an auxiliary motor or engine. This technical solution of the problem may be used with advantage, for example where the underground motor is electrically actuated. It permits positive or negative pressures with respect to the pressure prevailing at a predetermined point to be obtained.

The balanced thrust bearing which is obtained by the aforesaid means may be mounted at any point of the motor shaft or the equivalent parts. It may be also split up into a number of elements arranged lengthwise of the shaft or parts. It may be combined with the shaft bearings or with a complementary thrust bearing of known type adapted to become operative if the balanced thrust bearing has a breakdown.

According to a further feature of the invention and for limiting the extent of wear of the pistons in their recesses, the surfaces of these pistons may be provided with a coating made of an anti-abrasive material. Clearances may be also provided for permitting a fluid flow for lubricating the piston surfaces.

For a better understanding of the invention, reference will now be made to the accompanying diagrammatic drawings wherein:

Fig. 3 is a similar axial sectional view showing another constructional modification including multiple thrust bearings and venturis housed in the shaft of the underground motor.

Figure 1:
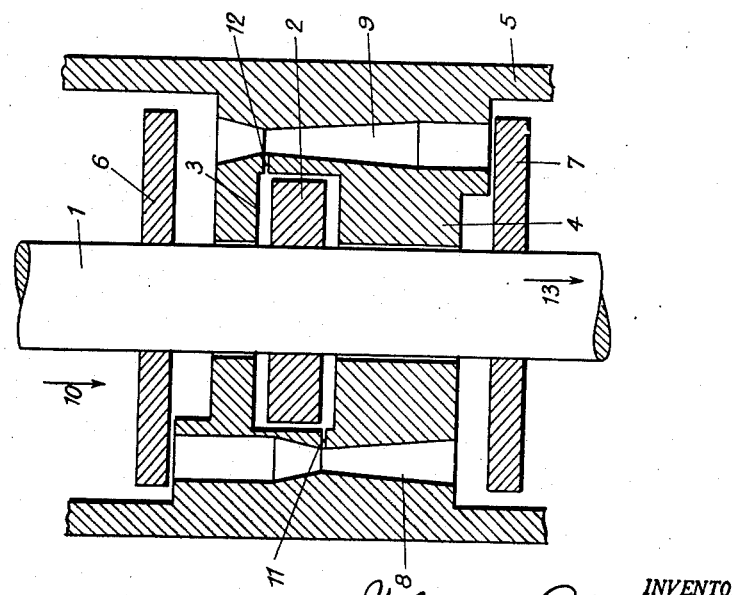
Fig. 1 is an axial sectional view of a constructional form of subterranean motor equipped with a balanced thrust bearing according to the invention.

In the showing of Fig. 1, the shaft 1 of a drilling motor for underground work carries a piston 2 fixed to it in any suitable way and movable through a chamber 3 forming a cylinder provided in a stator assembly 4 which is shown as being in one-piece for the sake of clearness but is actually made up of a number of parts 5 forming the motor body. The shaft 1 also carries outside the stator assembly 4 a pair of discs 6, 7. In the stator part 4 are provided two venturi tubes 8, 9 arranged as shown, the direction of circulation of the fluid being the one indicated by the arrow 10. Small diameter ducts 11, 12 provide a communication between the throttled part of each venturi 8, 9 with one face of the piston 2. It will be seen from the drawing that the inlet aperture for the venturi 9 and the outlet aperture for the venturi 8 are always free, while the inlet aperture for the venturi 8 and the outlet aperture for the venturi 9 may be throttled by a motion of the discs 6 and 7.

The operation of this balanced thrust bearing is as follows: The fluid flows downwardly as indicated by the arrow 10 and passes through the two venturis. Assuming a thrust to be exerted downwardly upon the shaft 1 as indicated by the arrow 13 so that said shaft is moved downwardly with respect to the stationary part 4 and the body 5 of the motor, the disc 6 is moved toward the inlet aperture of the venturi 8 while the disc 7 is moved off the outlet aperture of the venturi 9. The rate of flow through the venturi 8 is therefore reduced so that the rate of flow through the throttled portion of this venturi is diminished and the suction effect transmitted by its channel 11 to the cylinder 3 under the piston 2 is smaller. Conversely the rate of flow through the venturi 9 is increased and the suction effect transmitted to the cylinder 3 above the piston 2 through the channel 12 is larger. A differential pressure follows which tends to balance the axial effort exerted upon the shaft 1 and to transmit the same to the stationary part 4. The proportion of the total rate of flow of the fluid stream which passes through each of the nozzles or venturis is determined by the position of the discs 6, 7 operatively connected to the shaft 1 i.e. by the motion of said shaft so that a tendency toward a balanced position is created.

Figure 2:
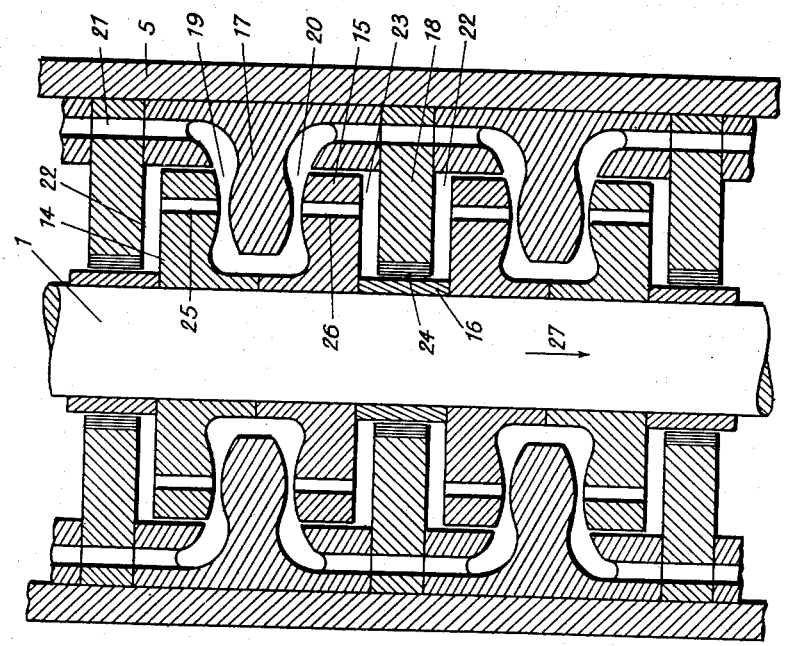
Fig. 2 is a similar view showing a constructional modification including multiple thrust bearings and venturis provided between a stationary part and a rotary part of the motor.

According to the constructional form shown in Fig. 2, the shaft 1 of the underground motor carries symmetrical discs 14, 15 arranged pairwise, the neighboring pairs of discs being separated by intermediate rings 16. Alternately arranged parts 17, 18 are secured to the body 5 of the underground motor and are therefore motionless. The parts 17 have a radially extending plane of symmetry and such an outline that they define with the adjacent faces of the discs 14, 15 radial venturis 19, 20. The flow of the circulating fluid is ensured between the sets of venturis 19, 20 by annular channels 21. The thickness of the parts is such as to define on the opposite sides of each part chambers 22, 23 forming a cylinder in which the piston made up of the discs 14, 15 is movable. Rubber or like linings 24 cooperate with the rings 16 for providing a satisfactory fluid tightness while guiding the shaft and providing bearings. The chamber 22 communicates with the throttled part of the venturi 19 through channels 25, while the chamber 23 communicates with the throttled part of the venturi 20 through passages 26.

The operation of this multiple thrust bearing takes place as follows:

The fluid flows axially through the thrust bearing via the passages 21 and then via the series venturis 19, 20 and thus undergoes a double radial displacement before flowing back toward the chambers 21 and so on. It may be assumed that a downwardly directed thrust is exerted upon the shaft 1 of the underground motor as shown by the arrow 27. The discs 14, 15 are thus urged downwardly which throttles the venturi 19 and increases the sectional area of the venturi 20. In view of the reduction of the sectional area of the venturi 19, the rate of flow of the fluid therethrough is increased so that the suction effect transmitted by the passage 25 to the chamber 22 defined above the discs 14 is also increased. However the rate of flow of the fluid through the venturi 20 is reduced while the suction effect transmitted by the passage 26 to the chamber 23 situated under the discs 15 is smaller. A differential pressure is thus created which exerts itself upon the discs 14, 15 and consequently upon the shaft 1 in a direction opposite to the one of the thrust 27, whereby said thrust is transmitted as hereinbefore stated to the body 5 of the motor. The arrangement is such that all even numbered nozzles are mutually equal while all odd numbered nozzles are mutually equal. A tendency is thus created in each particular instance toward the attainment of a state of stable equilibrium since the vertical displacement of the shaft is checked by the resultant pressure variations.

In the showing of Fig. 3, the shaft 1 of the underground motor which is here in the shape of a one-piece element for the sake of clearer illustration involves a pair of superimposed longitudinal venturis 28, 29 while the multiple thrust bearing is made up of a pair of stacks of elementary bearings separated by a compensating block.

The motor shaft 1 also carries a pair of rotor assemblies including sleeves 30, 31 defining with said shaft annular chambers 32, 33 and carrying series of piston-like discs 34, 35 which are slidably fitted in cylinder chambers 36, 37 delineated by annular stator parts 38, 39 carried by tubes 40, 41 operatively connected to the motor body 5 while defining axial flow passages 42.

The throttled portions of the venturis 28, 29 communicate with the annular chambers 32, 33 through passages 43, 44. These chambers communicate through ports 45, 46 with the cylinders 36, 37. The chambers 36 are provided under the pistons 34, while the chambers 37 are provided over the pistons 35. The other face of these pistons communicate with the pressure space in the flow passages 42 through ports 47, 48. The flow passages 42 are provided opposite to the locations of the parts 38, 41 with special devices (not shown) adapted to create a slight over-pressure at the inlet end of said passages, thereby driving a portion of the liquid through each of the venturis. This over-pressure may be eventually adjusted by the axial motions of the shaft. These second faces of the parts 38 carry coatings or linings 49 (for example rubber linings) acting as bearings when the motor is started or when the balancing system ceases to operate for any reason. The pistons 34, 35 are also provided on their peripheral face with rubber or like linings 50 behaving as bearings and ensuring full axial fluid tightness.

The upper aperture 51 of the venturi 28 and the lower aperture 52 of the venturi 29 are free, and the circulating fluid is distributed among such venturis and the flow passages 42. However, the free sectional area of the two other apertures 53, 54 may be altered when a relative axial displacement of the shaft and motor body takes place, owing to the action of an annular compensating block 55 which belongs to the stator stack and provided with radial passages 56, 57 communicating with the aforesaid apertures 53, 54.

The operation of this multiple thrust bearing takes place as follows:

Assuming an axial thrust directed downwardly to be exercised upon the shaft 1 as depicted by the arrow 58, the axial motion of the shaft 1 with respect to the stator stack of parts throttles the aperture 53 and unmasks the aperture 54. The rate of flow of the fluid through the venturi 28 is thus smaller, and the suction effect transmitted through the passages 43 to the chamber 32 and to the lower faces of the pistons 34 is also smaller so that the pressure acting upwardly upon the pistons 34 grows larger, while the suction effect transmitted through the passage 44 to the upper faces of the pistons 35 increases, whereby the downwardly exerted pressure upon said pistons become smaller. Here again there is thus obtained a compensating action upon the shaft 1 and the transmission of the thrust to the body 5 of the underground motor. Consequently the assembly has a tendency to assume a state of stable equilibrium as in the aforesaid cases. Beyond a limited degree of motion which is set when building the apparatus, the rubber abutments come into operation.

Minor constructional details may be altered without departing from the scope of the subjoined claims.

What is claimed is:

1. In a motor for subterranean drilling such as a drilling turbine comprising a set of rotor parts, a set of stator parts and axial bearings and subjected to axial thrusts, a chamber fixed with respect to one of said sets of parts of the motor, a double acting piston slidable through said chamber and fixed to the other set of parts of the motor, a working fluid, nozzles of the convergent-divergent type known as venturi through which said fluid flows, passages providing communication between said nozzles and the piston faces inside said chamber for exerting pressures upon said faces, and means for locally varying the flow velocity of the working fluid through said nozzles in response to the axial thrusts operative upon the motor for relatively modifying the pressures exerted upon said piston faces and bringing the rotor and stator parts of the motor into a condition of equilibrium with respect to said axial bearings.

2. In a motor for subterranean drilling such as a drilling turbine actuated by a circulating fluid and subjected to axial thrusts comprising a set of rotor parts and a set of stator parts axially movable with respect to one another and axial bearings, chamber means fixed with respect to said stator parts, a primary set and a secondary set of nozzles constituted by venturis of the convergent-divergent type for the flow of said fluid, said nozzles being formed in the stator parts, a double acting piston slidable through said chamber means and fixed to said rotor parts, channels providing communication between the primary set of nozzles and one face of the piston, other channels establishing communication between the secondary set of nozzles and the other face of the piston so as to exert upon said piston faces balancing pressures, and means for throttling the flow of the circulating fluid through one set of nozzles incidental to the axial displacement of the rotor parts with respect to the stator parts responsive to the axial thrusts for varying the pressure exerted upon the piston face communicating with said set of nozzles and for compensating for the axial thrusts that produce said relative axial displacement of the rotor and stator parts and for balancing the axial bearings.

3. A motor for subterranean work according to claim 2, characterized by the fact that said nozzles provide constricted throat portions, channels providing communication between the venturi throats and the piston faces, the throttling means being operatively connected with the rotor parts and being arranged in front of the nozzles for selectively throttling the flow of the fluid through said nozzles.

4. In a motor for subterranean drilling such as a drilling turbine actuated by a circulating fluid, subjected to axial thrusts and comprising a set of rotor parts and a set of stator parts arranged for relative axial motion and axial bearings, chambers fixed with respect to said stator parts, double acting pistons slidable through said chambers, each piston including a pair of annular elements defining therebetween an axial gap, the opposite faces of the elements forming the active faces of the pistons while the oppositely located faces are streamlined, annular stator elements engaged into said axial gaps of each of said pistons, the oppositely located faces of said annular stator elements being so streamlined as to define with the oppositely disposed faces of the pistons nozzles of the venturi type for the flow of the circulating fluid, and channels establishing communication between said nozzles and the active faces of the pistons for exerting therein balancing pressures, whereby an axial motion of said rotor parts with respect to said stator parts responsive to the axial thrusts causes an alteration of the relative cross sectional areas of said nozzles and the pressures transmitted to the active faces of the pistons in such a direction as to compensate for said thrusts for balancing said axial bearings.

5. In a motor for subterranean drilling such as a drilling turbine actuated by a circulating fluid subjected to axial thrusts and comprising a set of rotor parts and a set of stator parts that are axially movable with respect to one another, axial bearings and a central shaft carrying said rotor parts, chambers fixed with respect to said stator parts, double acting pistons slidable through said chambers and operatively connected to said rotor parts, a primary convergent-divergent nozzle through which said fluid flows and provided through said shaft, said nozzle forming a constricted throat, channels providing communication between said throat and one face of the pistons, a secondary convergent-divergent nozzle through which said fluid flows and also provided in said shaft, said secondary nozzle also forming a constricted throat, channels providing communication between said last-named throat and the other face of the pistons, and means for modifying the flow of the circulating fluid through said primary and secondary nozzles in terms of the relative axial displacement of the rotor parts and stator parts responsive to the axial thrusts so as to compensate for said thrusts and to balance said axial bearings.

6. In a motor for subterranean drilling such as a drilling turbine actuated by a circulating fluid, subjected to axial thrusts and including a set of rotor parts, a set of stator parts and axial bearings, chamber means fixed with respect to one set of said motor parts, a double acting piston slidable through said chamber and fixed to the other set of motor parts, means bringing one face of said piston into communication with the circulating fluid, a pump, and means for establishing communication between the other face of said piston and said pump so as to cause such a differential force to operate on said piston as to compensate for the axial thrusts exerted on the motor, thereby balancing said axial bearings.

7. In a motor for subterranean drilling such as a drilling turbine actuated by a circulating fluid comprising a set of rotor parts and a set of stator parts axially movable with respect to one another and axial bearings, chamber means fixed with respect to one set of said rotor parts, a double acting piston slidable through said chamber and fixed to the other set of rotor parts, nozzles constituted by venturis of the convergent-divergent type through which said fluid flows, passages providing a communication between said venturis and the piston faces inside said chamber means so as to exert pressures on said piston faces, and means for locally varying the flow rate of said fluid through said venturis in response to the relative axial displacement of said sets of parts for relatively modifying the pressures exerted upon said piston faces and bringing said rotor parts and said stator parts of the motor into a condition of balance with respect to said axial bearings.

References Cited in the file of this patent

UNITED STATES PATENTS

| | | |
|---|---|---|
| 898,462 | Griessmann | Sept. 15, 1908 |
| 1,030,153 | Barbezat | June 18, 1912 |
| 2,605,147 | Raichle | July 29, 1952 |